United States Patent [19]

Dunbar

[11] 4,383,711
[45] May 17, 1983

[54] TRAILER SUPPORT FRAME APPARATUS

[76] Inventor: Glenn G. Dunbar, 2608 Overbrook, Toledo, Ohio 43614

[21] Appl. No.: 226,949

[22] Filed: Jan. 21, 1981

[51] Int. Cl.³ .............................................. B62D 33/04
[52] U.S. Cl. ..................................... 296/181; 414/542
[58] Field of Search ....................... 296/181, 183, 187; 414/542; 410/2

[56] References Cited

U.S. PATENT DOCUMENTS

| | | | |
|---|---|---|---|
| 1,124,217 | 1/1915 | Emery | 414/542 |
| 2,833,588 | 5/1958 | Black | 410/2 |
| 2,993,728 | 7/1961 | Beran et al. | 296/181 |
| 3,393,920 | 7/1968 | Ehrlich | 296/181 |
| 3,572,513 | 3/1971 | Tantlinger | 414/542 |
| 4,297,071 | 10/1981 | Dunbar | 414/542 |

Primary Examiner—Robert R. Song
Attorney, Agent, or Firm—Emch, Schaffer & Schaub Co.

[57] ABSTRACT

The invention is directed to a support frame for a trailer having opposed side walls. At least one channel is positioned on the opposed side walls of the trailer. A substantially L-shaped bracket having a first leg and a second leg is secured to the channel. The first leg of the bracket extends over and engages the channel and the second leg of the bracket extends along the surface of the channel. A support surface is attached to the second leg of the bracket and the support surface extends from the surface of the second leg in a direction that is substantially perpendicular to the surface of the second leg. The support surface is disposed in the trailer for supporting loading structure between the opposed side walls of the trailer.

8 Claims, 4 Drawing Figures

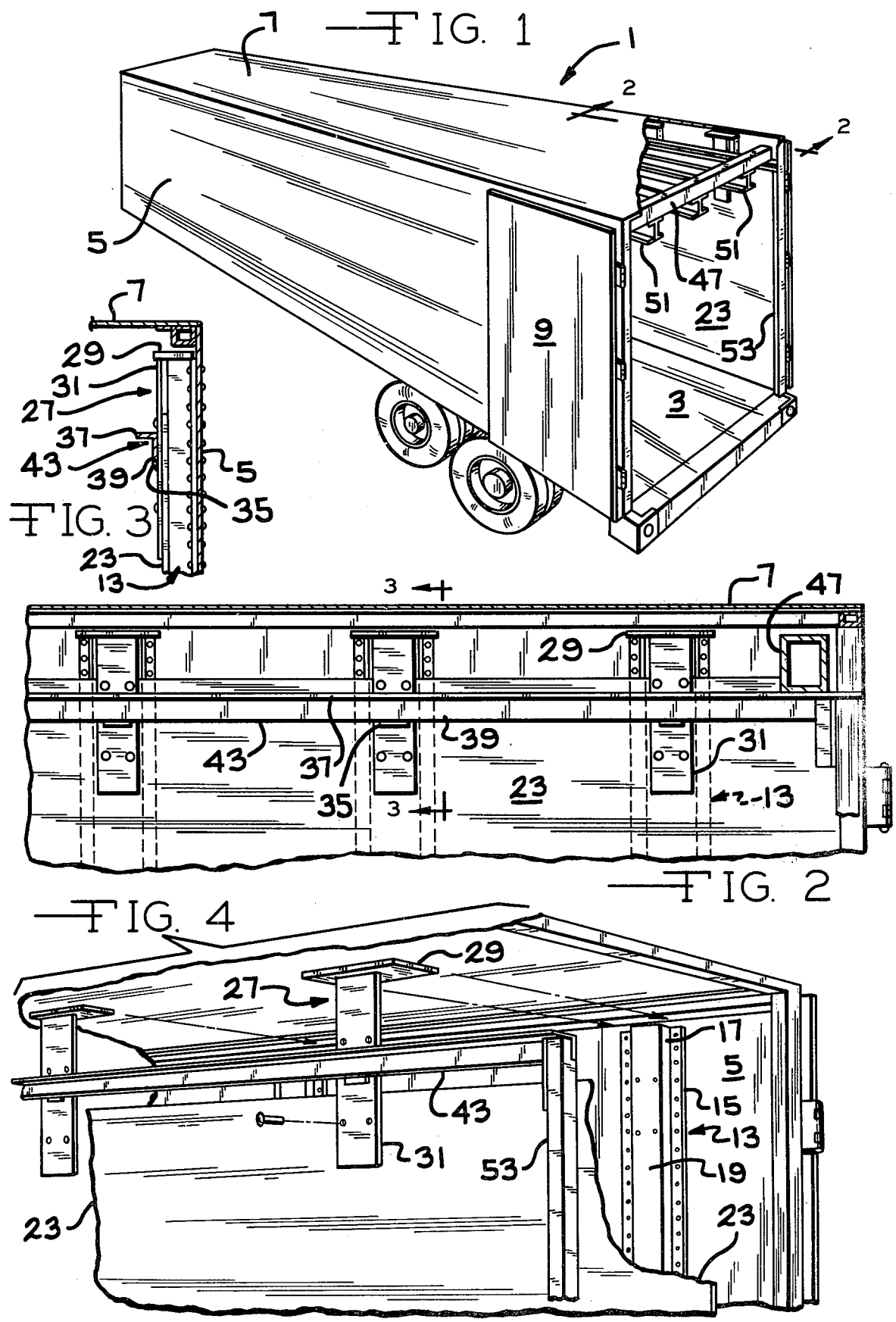

TRAILER SUPPORT FRAME APPARATUS

BACKGROUND OF THE INVENTION

The present invention relates to a support frame for a trailer having opposed side walls. In one of the more specific aspects of the present invention, brackets are positioned along the side walls of the trailer to form a support frame upon which loading structure may be attached.

Tractor trailer rigs have become an essential element in distribution of goods. Almost all types of goods, at some point in their distribution are transported in tractor trailer rigs. The trailer forms a long enclosed chamber into which a large quantity of material can be positioned.

However, it is frequently difficult to load and unload goods positioned in the trailer. This is particularly true if the goods are particularly heavy or awkward to handle. It is also difficult to utilize lift trucks or other apparatus to load and unload the trailer as there is frequently not enough room for such vehicles to properly operate in the trailer. These difficulties are further compounded when the trailer is to be loaded or unloaded at a site that is not designed to handle tractor trailer rigs. Therefore, it would be desirable to have a trailer having a support frame incorporated into the trailer upon which equipment can be connected for unloading and loading the trailer.

SUMMARY OF THE INVENTION

According to the invention there is provided a support frame for a trailer having opposed side walls. At least one channel is positioned on the opposed side walls of the trailer. A substantially L-shaped bracket having a first leg and a second leg is secured to the channel. The first leg of the bracket extends over and engages the channel and the second leg extends along the surface of the channel. A support surface is attached to the second leg of the bracket and the support surface extends from the surface of the second leg in a direction that is substantially perpendicular to the surface of the second leg. The support surface is disposed in the trailer for supporting loading structure between the opposed side walls of the trailer.

An object of the invention is to provide a support frame for a trailer having opposed side walls.

An additional object of the invention is to provide a support frame upon which loading structure can be positioned between the opposed side walls of a trailer.

Other objects and advantages of the invention will become apparent as the invention is described hereinafter in more detail with reference to the accompanying drawings.

DESCRIPTION OF THE DRAWINGS

FIG. 1 is a perspective view of a support frame for a trailer in accordance with the present invention.

FIG. 2 is a partial side elevation view of the support frame.

FIG. 3 is a partial side view of the support frame of the present invention.

FIG. 4 is an exploded perspective view, partly broken away of the support frame of the present invention.

DESCRIPTION OF THE PREFERRED EMBODIMENTS

The present invention is directed to a support frame for a trailer having opposed side walls. The details of the invention will be better understood by referring to the attached drawings in connection with the following description.

A trailer 1 is shown having a base 3, side walls 5 and a top 7. Doors 9 can be provided at the open end of the trailer for enclosing the trailer.

Positioned on the interior of the side walls 5 are channels 13. The channels have a substantially u-shaped cross section defined by sides 17 and a base 19. Flanges 15 extend from the sides 17 of the u-shaped channel. The channels are positioned on the interior of the side walls 5 so that the flanges engage the side walls of the trailer. The flanges 15 of the channels are secured to the side walls 5 of the trailer by any suitable securement means such as rivets or bolts. With the flanges 15 positioned against the side walls 5 of the trailer the base 19 of the u-shaped channel 13 will be spaced apart from the side walls of the trailer. Normally a plurality of the channels 13 will be positioned along the opposed side walls of the trailer. The channels normally extend from the base 3 of the trailer to almost the top of the side walls 5. An interior panel 23 is normally positioned on the interior of the trailer in contact with the base 19 of the u-shaped channel. The panel 23 forms the finished interior surface on the side walls of the trailer. The interior panel 23 normally extends from the base 3 of the trailer almost to the top of the side walls 5 of the trailer. Frequently the panels will terminate at the top of the channels 13. A suitable securement means is used to affix the panel 23 to the base 19 of the u-shaped channels 13. However, it should be noted that the interior panels 23 are not always positioned in the trailers and that such panels are not required to practice the present invention.

A substantially L-shaped bracket 27 is positioned on the interior surface of the panels 23. The L-shaped bracket has a first leg 29 and a second leg 31. The first leg 29 and second leg 31 are positioned so that the legs are substantially perpendicular to one another. The L-shaped bracket 27 is positioned on the panels 23 at the location of the channels 13. The first leg 29 of the bracket extends over and engages the top of the channel 13. The top of the channel 13 acts to support the bracket 27 in the interior of the trailer. The second leg 31 of the bracket extends along the panels 23 and the base 19 of the channels 13. The second leg 31 is secured to the panel and to the base 19 of the channel by any suitable securement means.

A support 35 is positioned on the second leg 31 of the bracket 27. The support is attached to the second leg 31 of the bracket 27 by any suitable securement means. The supports 35 are positioned in substantial alignment along the side wall of the trailer. The supports 35 form a support surface.

A support member 43 is positioned on the support surface of the supports 35 located on the opposed side walls 5 of the trailer. The support member 43 has a first leg 37 and a second leg 39. The support members 43 are positioned in substantial alignment on the opposed side walls 5 of the trailer. Frame members 47 are positioned along the support members 43. The frame members 47 engage the support member 43 located on the opposite sides of the trailer. The frame members 47 are normally positioned so that they are substantially perpendicular to the support members 43. The frame members 47 are positioned in spaced apart relationship with the base 3 of the trailer. The frame members 47 form a frame work upon which additional structural elements may be attached. As shown in FIG. 1, beams 51 have been secured to the frame members 47. The beams 51 are particularly suitable for attaching additional handling apparatus (not shown) for moving or handling cargo that is carried in the trailer 1. The handling apparatus is normally capable of lifting and transporting the cargo along the beams 51. Thus, the handling apparatus can be used to load or unload cargo at any location in the trailer. The handling apparatus can also be an integral unit that can be carried in the trailer attached to the beams so that it is always available for loading and unloading cargo.

Columns 53 can be positioned in contact with the support members 43 at the end of the support members adjacent the door to the trailer. The columns extend from the base 3 of the trailer to engage the support members 43. The columns provide support for the ends of the support members 43 that are adjacent the open end of the trailer.

Having described the invention in detail and with reference to the drawings, it is understood that such specifications are given for the sake of explanation. Various modifications and substitutions other than those cited can be made without departing from the scope of the invention as defined by the following claims.

What I claim is:

1. A support frame for a trailer having opposed side walls comprising:

at least one channel positioned on the opposed side walls of said trailer;

a substantially L-shaped bracket having a first leg and a second leg secured to said channels, the first leg of said bracket extending over and engaging said channel, said second leg extending along the surface of said channel; and a support surface attached to said second leg of said bracket, said support surface extending from the surface of said second leg in a direction that is substantially perpendicular to the surface of said second leg whereby said support surface is disposed for supporting loading structure between said opposed side walls of said trailer.

2. The frame of claim 1 wherein a plurality of channels are positioned in spaced apart parallel relationship on the opposed side walls of the trailer, said channels extending in a substantially vertical plane along said side walls, said channels terminating below the top of said side walls.

3. The frame of claim 2 wherein said first leg of said brackets extend over and engage the top of said channels.

4. The frame of claim 3 wherein said support surfaces on said bracket are in substantial alignment.

5. The frame of claim 4 wherein a support member is positioned on the support surfaces on each opposed side wall of said trailer.

6. The frame of claim 5 wherein frame members are positioned on said support members, said frame members engaging said support members located on said opposed side walls of said trailer, said frame members extending in a direction that is substantially perpendicular to said side walls of said trailer.

7. The frame of claim 6 wherein said loading structure is connected to said frame members.

8. The frame of claim 1 wherein columns are positioned at the ends of said support members that are adjacent the opening to said trailer, said columns extending from said support members to the base of said trailer, said columns providing support for said ends of said support member located adjacent the opening to said trailer.

* * * * *